(12) United States Patent
Faibish et al.

(10) Patent No.: US 9,213,721 B1
(45) Date of Patent: Dec. 15, 2015

(54) FILE SERVER SYSTEM HAVING TIERED STORAGE INCLUDING SOLID-STATE DRIVE PRIMARY STORAGE AND MAGNETIC DISK DRIVE SECONDARY STORAGE

(75) Inventors: Sorin Faibish, Newton, MA (US); Christopher H. Stacey, Christchurch (NZ); Peter Bixby, Westborough, MA (US); William C. Whitney, Marlborough, MA (US)

(73) Assignee: EMC CORPORATION, Hopkinton, MA (US)

( * ) Notice: Subject to any disclaimer, the term of this patent is extended or adjusted under 35 U.S.C. 154(b) by 1867 days.

(21) Appl. No.: 12/348,866

(22) Filed: Jan. 5, 2009

(51) Int. Cl.
G06F 7/00 (2006.01)
G06F 17/30 (2006.01)

(52) U.S. Cl.
CPC ................................ *G06F 17/30221* (2013.01)

(58) Field of Classification Search
None
See application file for complete search history.

(56) References Cited

U.S. PATENT DOCUMENTS

| | | | |
|---|---|---|---|
| 5,893,140 A | 4/1999 | Vahalia et al. | |
| 6,161,104 A | 12/2000 | Stakutis et al. | |
| 6,173,293 B1 | 1/2001 | Thekkath et al. | |
| 6,237,063 B1 | 5/2001 | Bachmat et al. | |
| 6,324,581 B1 | 11/2001 | Xu et al. | |
| 6,341,333 B1 | 1/2002 | Schreiber et al. | |
| 6,697,846 B1 | 2/2004 | Soltis | |
| 6,711,649 B1 | 3/2004 | Bachmat et al. | |
| 6,766,416 B2 | 7/2004 | Bachmat | |
| 6,775,679 B2 | 8/2004 | Gupta | |
| 6,904,470 B1 | 6/2005 | Ofer et al. | |
| 6,938,039 B1 | 8/2005 | Bober et al. | |
| 6,976,134 B1 | 12/2005 | Lolayekar et al. | |
| 6,985,914 B2 | 1/2006 | Venkatesh et al. | |
| 7,024,427 B2 | 4/2006 | Bobbitt et al. | |
| 7,444,662 B2 | 10/2008 | Faibish et al. | |
| 2004/0030822 A1 | 2/2004 | Rajan et al. | |
| 2004/0049513 A1* | 3/2004 | Yakir et al. | 707/100 |
| 2004/0054656 A1* | 3/2004 | Leung et al. | 707/1 |
| 2005/0198401 A1 | 9/2005 | Chron et al. | |
| 2005/0246382 A1 | 11/2005 | Edwards | |
| 2006/0075191 A1 | 4/2006 | Lolayekar et al. | |
| 2006/0212746 A1 | 9/2006 | Amegadzie et al. | |
| 2007/0088702 A1 | 4/2007 | Fridella et al. | |
| 2007/0179990 A1 | 8/2007 | Zimran et al. | |
| 2007/0266056 A1 | 11/2007 | Stacey et al. | |

OTHER PUBLICATIONS

Vahalia, Uresh, Unix Internals: The New Frontiers, 1996, p. 261-289 and 338-371, Prentice-Hall, Inc., Upper Saddle River, NJ.

(Continued)

*Primary Examiner* — Fred I Ehichioya
*Assistant Examiner* — Hasanul Mobin
(74) *Attorney, Agent, or Firm* — Krishnendu Gupta; Deepika Bhayana

(57) ABSTRACT

A file server system having solid-state drive primary storage and magnetic disk drive secondary storage aggressively moves newly created files from the primary storage to selected file systems in the secondary storage to match expected access patterns upon the files to different configurations of the file systems and for load balancing upon the file systems in the secondary storage. Upon read access to a file that has been moved to the secondary storage, or upon migration of a newly created file that was read in primary storage after creation, a corresponding stub file containing file mapping metadata is created in the primary storage. The file mapping metadata in the stub file maps the extent of the file to logical storage addresses in the secondary storage.

6 Claims, 13 Drawing Sheets

(56) References Cited

OTHER PUBLICATIONS

"Enginuity: The Symmetrix Storage Operating Environment," EMC White Paper, Jul. 2005, 22 pages, EMC Corporation, Hopkinton, MA.
"EMC Symmetrix DMX Architecture," Product Description Guide, Mar. 2004, 76 pages, EMC Corporation, Hopkinton, MA.
"Celerra Data Migration Service (CDMS)," White Paper, Jan. 2002, 14 pages, EMC Corporation, Hopkinton, MA.
Reine, David, "EMC Takes the Next Step—Moves Multi-Tiering Inside Symmetrix," The Clipper Group Navigator, Aug. 18, 2005, 5 pages, Clipper Group Inc., Wellesley, MA.
"Information Lifecycle Management: An Automated Approach," Technical White Paper, Dec. 8, 2003, 20 pages, EMC Corporation, Hopkinton, MA.
"Automated Resource Management," Technology Brief—Aug. 2002, 3 pages, The Enterprise Storage Group, Milford, MA.
Kang et al., Virtual Allocation: A scheme for flexible storage allocation, Proc. of OASIS workshop in conjunction with ASPLOS, Oct. 2004, 5 pages, Association for Computing Machinery, New York, NY.
Radding, Alan, "ATA/SATA drives fitting bigger niches," Storage Networking World Online, Mar. 8, 2004, 3 pages, Computerworld, Framingham, MA.
"Adaptive Power Management for Mobile Hard Drives," Apr. 1999, 11 pages, IBM Corp., San Jose, CA.
Colarelli et al., "The Case for Massive Arrays of Idle Disks (MAID)," USENIX Conference on File and Storage Technologies (FAST), Monterey, CA, Jan. 2002, 6 pages, USENIX, Berkeley, CA.
Zhu et al., "Reducing Energy Consumption of Disk Storage Using Power-Aware Cache Management," 10th International Symposium on High Performance Computer Architecture, IEEE Computer Society, 2004, 12 pages, IEEE, New York, NY.
Zhu et al., "PB-LRU: A Self-Tuning Power Aware Storage Cache Replacement Algorithm for Conserving Disk Energy," ICS'04, Jun. 26-Jul. 1, 2004, Saint-Malo, France, 10 pages, ACM, New York, NY.
Zedlewski et al., "Modeling Hard-Disk Power Consumption," FAST '03 Technical Program, Mar. 31-Apr. 2, San Francisco, 14 pages, USENIX, Berkeley, CA.
Bucy et al., The DiskSim Simulation Environment Version 3.0 Reference Manual, School of Computer Science, CMU-CS-03-102, Jan. 2003, 65 pages, Carnegie Mellon University, Pittsburg, PA.
"Half of stored files will never be accessed," ElectricNews.Net, theregister.co.uk, May 15, 2007, 2 pages, The Register, London, United Kingdom.
Lam, Terance L., "Improving File System Performance by Striping," Mar. 4, 1992, 10 pages, Computer Sciences Corporation, Numerical Aerodynamic Simulation Division, NASA Ames Research Center, Moffett Field, Mountain View, CA.
Fisch, Michael, "EMC Celerra FileMover Optmizes File Placement in Tiered Storage," The Clipper Group Navigator, Oct. 4, 2004, 4 pages, The Clipper Group, Inc., Wellesley, MA.
"EMC Celerra iSCSI Solutions Microsoft Exchange 2003 Best Practices," Engineering White Paper, Sep. 2005, 11 pages, EMC Corporation, Hopkinton, MA.
Genuth, Iddo, "Samsung's Solid State Disk Drive," TFOT, Dec. 13, 2006, 3 pages, The Future of Things, thefutureofthings.com.
Treadway, Tom, "Picking the right stripe size," Storage Interconnects & RAID, Storage Advisors Blog Archive, Jun. 5, 2006, to Oct. 27, 2007, 14 pages, Adaptec, Inc., Milpitas, CA.
"EMC in Major Storage Performance Breakthrough; First with Enterprise-Ready Solid State Flash Drive Technology," Jan. 14, 2008, 3 pages, EMC Corporation, Hopkinton, MA.
Rogers, James, "EMC Unveils SSDs on Symmetrix," Byte and Switch, Jan. 14, 2008, 2 pages, United Business Media Ltd., San Francisco, CA.
"EMC Tiered IP Storage Solution Using Rainfinity FMA and Celerra," Jul. 2008, 3 pages, EMC Corporation, Hopkinton, MA.
D. Patterson et al., "Introduction to Redundant Arrays of Inexpensive Disks (RAID)," Spring Compcon 89, Thirty-fourth IEEE Computer Society International Conference, Feb. 27-Mar. 3, 1989, p. 112-117, IEEE, New York, NY.
"Introducing RAID 5 on Symmetrix DMX," EMC White Paper, 2004, 12 pages, EMC Corporation, Hopkinton, MA.
"EMC solutions and services enhances IT Infrastructure to keep pace with expanding R&D efforts in India," Motorola Customer Profile, Dec. 2006, 2 pages, EMC Corporation, Hopkinton, MA.
"EMC Solutions for Oracle Database 10g/11g for Midsize Enterprises, EMC Celerra NS Series Multi-Protocol Storage System," Reference Architecture, Nov. 2008, 44 pages, EMC Corporation, Hopkinton, MA.

* cited by examiner

EXTENT MAP 130

| FILE OFFSET | LOGICAL BLOCK ADDRESS | LENGTH | STATUS |
|---|---|---|---|
| --------- | --------------------------- | --------- | --------- |
| --------- | --------------------------- | --------- | --------- |
| --------- | --------------------------- | --------- | --------- |
| --------- | --------------------------- | --------- | --------- |

FILE SERVER SYSTEM HAVING TIERED STORAGE INCLUDING SOLID-STATE DRIVE PRIMARY STORAGE AND MAGNETIC DISK DRIVE SECONDARY STORAGE

FIELD OF THE INVENTION

The present invention relates generally to computer data storage, and more particularly to tiered storage. The present invention relates specifically to a file server system storing files in tiered storage including a primary storage tier of solid-state drives, and a secondary storage tier of magnetic disk dives.

BACKGROUND OF THE INVENTION

Solid-state drives (SSDs) have been used for many years as USB "plug and play" peripheral devices for personal computers. These solid-state drives use electrically programmable nonvolatile semiconductor random access memory, commonly known as flash memory, for data storage. Initially the solid-state drives were used primarily for temporary backup and transfer of files between computers in lieu of floppy disks. Now increasing capacity and decreasing cost of the flash memory have made the solid-state drives suitable for replacement of magnetic disk drives in personal computers.

More recently solid-state drives have been introduced commercially into tiered storage arrays. For example, on Jan. 14, 2008, EMC Corporation announced that it was offering flash-based SSDs in a Symmetrix DMX-4 (Trademark) storage array. The flash-based SSDs provide ultra fast read/write performance, high reliability, and data integrity. In addition, the operating system software of the Symmetrix DMX-4 (Trademark) storage array includes the ability to easily provision, manage, replicate, and move data between flash drives and traditional Fibre Channel and SATA disk drives in the same array. The tiered storage aligns data availability, service level requirements, and software functionality with capacity and cost considerations for improved read/write performance, resiliency, and energy efficiency.

The file mover in the Symmetric DMX-4 (Trademark) storage array uses policy-based migration software originally developed for automated file movement in a tiered storage environment including a primary storage tier and a secondary storage tier. The policy-based migration software classifies files based on policy, and migrates the files in a transparent and non-disruptive fashion. Prior to incorporation of the SSDs into storage arrays, the policy migration software was used for automatic file movement between a primary storage tier comprised of high-speed disk drives, and a secondary storage tier comprised of low-speed high-capacity ATA disk drives, or optical storage or tape. The primary storage tier was used as a production data repository, and the secondary storage tier was used as an archival storage repository. The actual migration policy was initially configured by the system administrator, and could be modified by particular applications.

According to a typical migration policy, a file was originally created and accessed in the primary storage tier. If the duration of time from the last access time of a file in the primary storage tier to the present time became more than an expiration time limit, then the file was migrated from the primary storage tier to the secondary storage tier, and then the file in the primary storage tier was replaced with a symbolic link in the primary storage tier. The symbolic link in the primary storage tier pointed to the file in the secondary storage tier. If an application would write to a file in the secondary storage tier, then the file would be moved back to the primary storage tier. If an application would frequently read from a file in the secondary storage tier, then the file would be moved back to the primary storage tier.

SUMMARY OF THE INVENTION

It is desired to provide client access to a unified file system view or structure that includes files stored in both a primary storage tier of solid-state drive (SSD) storage and a secondary storage tier of magnetic disk drive storage such as high-capacity serial ATA (SATA) magnetic disk drive storage. It is desired to use the SSD storage tier as a cache file system for access to frequently used files, and to use the secondary storage tier for access to the less frequently used files. It is desired to move the less frequently used files automatically from the primary SSD storage tier to the secondary magnetic disk drive storage tier.

Although conventional policy-based migration software provides substantial advantages for a tiered storage system including a primary SSD storage tier a secondary magnetic disk drive storage tier, the conventional policy migration software does not fully exploit the advantages of SSD. In particular, SSD is not only fast but also it is nearly as fast as the random-access cache memory typically used in the file system cache of a file server. SSD also has no performance penalty for seeking data or due to data de-fragmentation. To more fully exploit these advantages of SSD, it is desirable to modify the basic migration process to split the migration of file data from the migration of file mapping metadata, and to use the SSD as a kind of write buffer for multiple concurrent write threads for migration from the primary SSD storage tier to the secondary magnetic disk drive storage tier. In this fashion, the SSD is especially suited for servicing metadata intensive applications using a fast "cache" file system, such as ClearCase (Trademark) application development, Oracle (Trademark) database, and e-mail applications.

In accordance with one aspect, the invention provides a computer-implemented method of providing a client with access to a specified file stored in tiered storage including solid-state drive primary storage and magnetic disk drive secondary storage. The computer-implemented method includes creating a specified file in the primary storage; and then after a period of no access to the specified file in the solid-state drive primary storage, moving the specified file from the solid-state drive primary storage to the magnetic disk drive secondary storage, and creating a corresponding stub file in the solid-state drive primary storage. The corresponding stub file contains file mapping metadata of the specified file in the magnetic disk drive secondary storage. The file mapping metadata of the specified file in the corresponding stub file maps an extent of data in the specified file to a logical block address of magnetic disk drive secondary storage containing data of the specified file in the magnetic disk drive secondary storage. Thereafter, the computer-implemented method further includes responding to a request from the client for reading data of the specified file by reading the file mapping metadata from the corresponding stub file to obtain the logical block address of the magnetic disk drive secondary storage containing the data of the specified file, and reading the data of the specified file from the logical block address of the magnetic disk drive secondary storage containing the data of the specified file, and returning to the client the data of the specified file read from the logical block address of the magnetic disk drive secondary storage containing the data of the specified file.

In accordance with another aspect, the invention provides a file server system including solid-state drive primary storage, magnetic disk drive secondary storage, and at least one processor coupled to the solid-state drive primary storage and coupled to the magnetic disk drive secondary storage for providing a client with access to files in the solid-state drive primary storage and for providing the client with access to files in the magnetic disk drive secondary storage. The at least one processor is programmed with a file migration engine program executable by said at least one processor to move a specified file from the solid-state drive primary storage to the magnetic disk drive secondary storage after a period of no activity upon the specified file in the solid-state drive primary storage. The at least one processor is further programmed with a stub file manager program executable by the at least one processor to create a corresponding stub file in the solid-state drive primary storage for the specified file. The corresponding stub file contains file mapping metadata of the specified file in the magnetic disk drive secondary storage. The file mapping metadata of the specified file in the corresponding stub file maps an extent of data in the specified file to a logical block address of magnetic disk drive secondary storage containing data of the specified file in the magnetic disk drive secondary storage. The stub file manager program is further executable by the at least one processor to respond to a request from the client for reading data of the specified file by reading the file mapping metadata from the corresponding stub file to obtain the logical block address of the magnetic disk drive secondary storage containing the data of the specified file. The at least one processor is further programmed to read the data of the specified file from the logical block address of the magnetic disk drive secondary storage containing the data of the specified file, and to return to the client the data of the specified file read from the logical block address of the magnetic disk drive secondary storage containing the data of the specified file.

In accordance with still another aspect, the invention provides a file server system including solid-state drive primary storage, magnetic disk drive secondary storage, and at least one processor coupled to the solid-state drive primary storage and coupled to the magnetic disk drive secondary storage for providing a client with access to files in the solid-state drive primary storage and for providing the client with access to files in the magnetic disk drive secondary storage. The at least one processor is programmed with a file migration engine program executable by said at least one processor to move a specified file from the solid-state drive primary storage to the magnetic disk drive secondary storage after a period of no activity upon the specified file in the solid-state drive primary storage. The at least one processor is further programmed with a stub file manager program executable by the at least one processor to create a corresponding stub file in the solid-state drive primary storage for the specified file. The corresponding stub file contains file mapping metadata of the specified file in the magnetic disk drive secondary storage. The file mapping metadata of the specified file in the corresponding stub file maps an extent of data in the specified file to a logical block address of magnetic disk drive secondary storage containing data of the specified file in the magnetic disk drive secondary storage. The stub file manager program is further executable by the at least one processor to respond to a request from the client for reading data of the specified file by reading the file mapping metadata from the corresponding stub file to obtain the logical block address of the magnetic disk drive secondary storage containing the data of the specified file, and the at least one processor is further programmed to read the data of the specified file from the logical block address of the magnetic disk drive secondary storage containing the data of the specified file, and to return to the client the data of the specified file read from the logical block address of the magnetic disk drive secondary storage containing the data of the specified file. The magnetic disk drive secondary storage contains a plurality of file systems, and the file migration engine is executable by the at least one processor to move the specified file from the solid-state drive primary storage to the magnetic disk drive secondary storage by executing a respective file mover program thread for a selected one of the plurality of file systems to move the specified file from the solid-state drive primary storage to the selected one of the plurality of file systems in the magnetic disk drive secondary storage. The file systems have been configured for different application access patterns. The file server system further includes a policy engine program executable by the at least one processor to select the selected one of the plurality of file systems in the magnetic disk drive secondary storage in order to match an expected access pattern upon the specified file to a configuration of the selected one of the plurality of the file systems, and to balance loading upon the plurality of file systems in the magnetic disk drive secondary storage.

BRIEF DESCRIPTION OF THE DRAWINGS

Additional features and advantages of the invention will be described below with reference to the drawings, in which.

Figure 1:
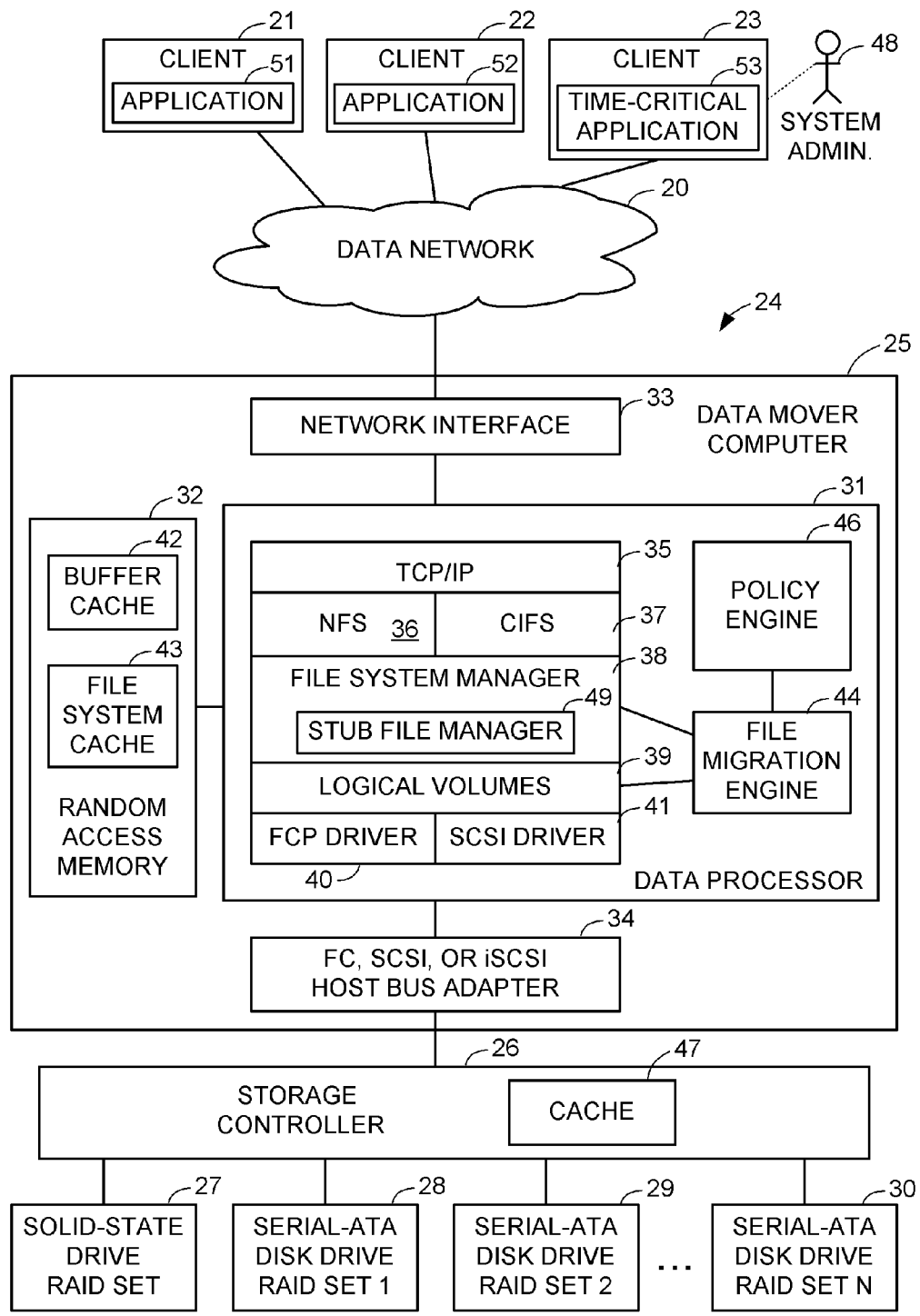
FIG. 1 shows a data processing system incorporating the present invention in a file server system including a data mover computer and a cached disk array having tiered storage.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system incorporating the present invention. The data processing system includes a data network 20 interconnecting clients 21, 22, 23 to a network file server 24. The data network 20 may include any one or more of network connection technologies, such as Ethernet, and communication protocols, such as TCP/IP. The clients 21, 22, 23, for example, are workstations such as personal computers using either the UNIX® operating system or the Microsoft WINDOWS® operating system. One of the clients 23 is operated by a system administrator 48.

The network file server 24 includes a data mover computer 25, a storage controller 26, and redundant arrays of inexpensive disks (RAID) 27, 28, 29, and 30. The network file server 24 is managed as a dedicated network appliance, integrated with popular network file systems in a way, which, other than its superior performance, is transparent to the end user. The data mover computer 25, for example, is a high-end commodity computer. Further details regarding the construction of a network file server using a data mover computer and a storage controller are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

The data mover computer 25 includes a data processor 31, random access memory 32, a network interface 33 providing a port to the data network 20, and a host bus adapter 34 providing a Fibre Channel (FC), Small Computer Systems Interface (SCSI), or SCSI over IP (iSCSI) link to the storage controller 26.

The data processor 31 is programmed primarily for servicing network client requests for access to files stored in the RAID sets of disk drives 27, 28, 29, 30. This programming includes a TCP/IP programming layer 35 for communicating with the network clients 21, 22, 23 in accordance with the Transmission Control Protocol (TCP), a Network File System (NFS) module 36 for network file access in accordance with the NFS file access protocol, a Common Internet File System (CIFS) module 37 for network file access in accordance with the CIFS file access protocol, a file system manager 38, a logical volumes layer 39, a Fiber Channel Protocol (FCP) driver 40, and an SCSI driver 41.

The random access memory 32 includes a buffer cache 42 and a file system cache 43. Read data and write data are streamed through the buffer cache 42 between the network clients 21, 22, 23 and the storage controller 26. The file system manager 38 maintains recently accessed file system data and metadata in the file system cache 43. For example, each file system is a UNIX®-based file system managed as described in Uresh Vahalia, Unix Internals: The New Frontiers, Chapter 9, "File System Implementations," Prentice-Hall, Inc., New Jersey, 1996, p. 261-289.

Each file system includes a hierarchy of directories and files. Each file system is built on a logical volume of contiguous logical block addresses of storage accessible through the storage controller 26. The storage controller 26 is configured to map the logical block addresses of each logical volume to one or more of the RAID sets 27, 28, 29, 30. The storage controller 26 may also have a random access cache memory 47 for storing recently accessed data in the RAID sets.

As shown in FIG. 1, a first RAID set 27 is configured from solid-state drives using flash memory for data storage. The raid sets 28, 28, 30, are configured from magnetic disk drives such as high-capacity serial-ATA (SATA) disk drives. There are a multiplicity of "N" SATA RAID sets 28, 29, 30, etc., linked to the storage controller 26. A respective logical storage volume is configured from each raid set 27, 28, 28, 30, etc. linked to the storage controller, and a respective file system is built upon each of the logical volumes.

In operation, the file system manager 38 responds to requests from client applications 51, 52, 53 for creating files by creating the files in the solid-state drive RAID set 27. After expiration of a period of no access activity upon a newly created file, the newly created file is moved from the solid-state drive RAID set 27 to a selected one of the SATA RAID sets 28, 29, 30. For example, the data processor 31 of the data mover 25 is programmed with a policy engine 46 that sets the period of no activity and selects the selected one of the SATA RAID sets 28, 29, 30. The data processor 31 is also programmed with a file migration engine 44 that moves the file from the solid-state drive RAID set 27 to the selected one of the SATA RAID sets 28, 29, 30 under control of the policy engine 46.

As will be further described below, the policy engine 46 is configured with policies especially adapted for movement of files between the solid-state drive RAID set 27 and the SATA RAID sets 28, 29, 30 to exploit the relative advantages and disadvantages of the solid-state drives in comparison to the SATA drives. For example, newly created files are aggressively moved from the solid-state RAID set 73 to selected ones of the SATA RAID sets 73, 74, 75 to match expected access patterns upon the files to different configurations of the file systems and for load balancing upon the file systems in the SATA RAID sets.

Sometimes the file server system splits migration of file mapping metadata from the migration of the file data between the solid-state drive primary storage 27 and the SATA secondary storage 28, 29, 30. For example, upon read access to a file that has been moved to the SATA secondary storage, or upon migration of a newly created file that was read in solid-state drive primary storage after creation, a stub file manager 49 creates a corresponding stub file in the solid-state drive primary storage. The corresponding stub file contains file mapping metadata mapping the extent of the migrated file to logical storage addresses in the SATA RAID set containing the migrated file. Therefore, after a specified file has been moved to the SATA secondary storage and a corresponding stub file has been created in the solid-state drive RAID set 27, the file system manager 38 may quickly access the file in response to a request from an application process for a read or write. The file system manager 38 invokes the stub file manager 49 to read the file mapping metadata from the stub file to obtain a logical block address in the SATA RAID set containing the file, and then the file system manager 38 reads data from or writes data to the logical block address in the SATA RAID set containing the file.

Figure 2:
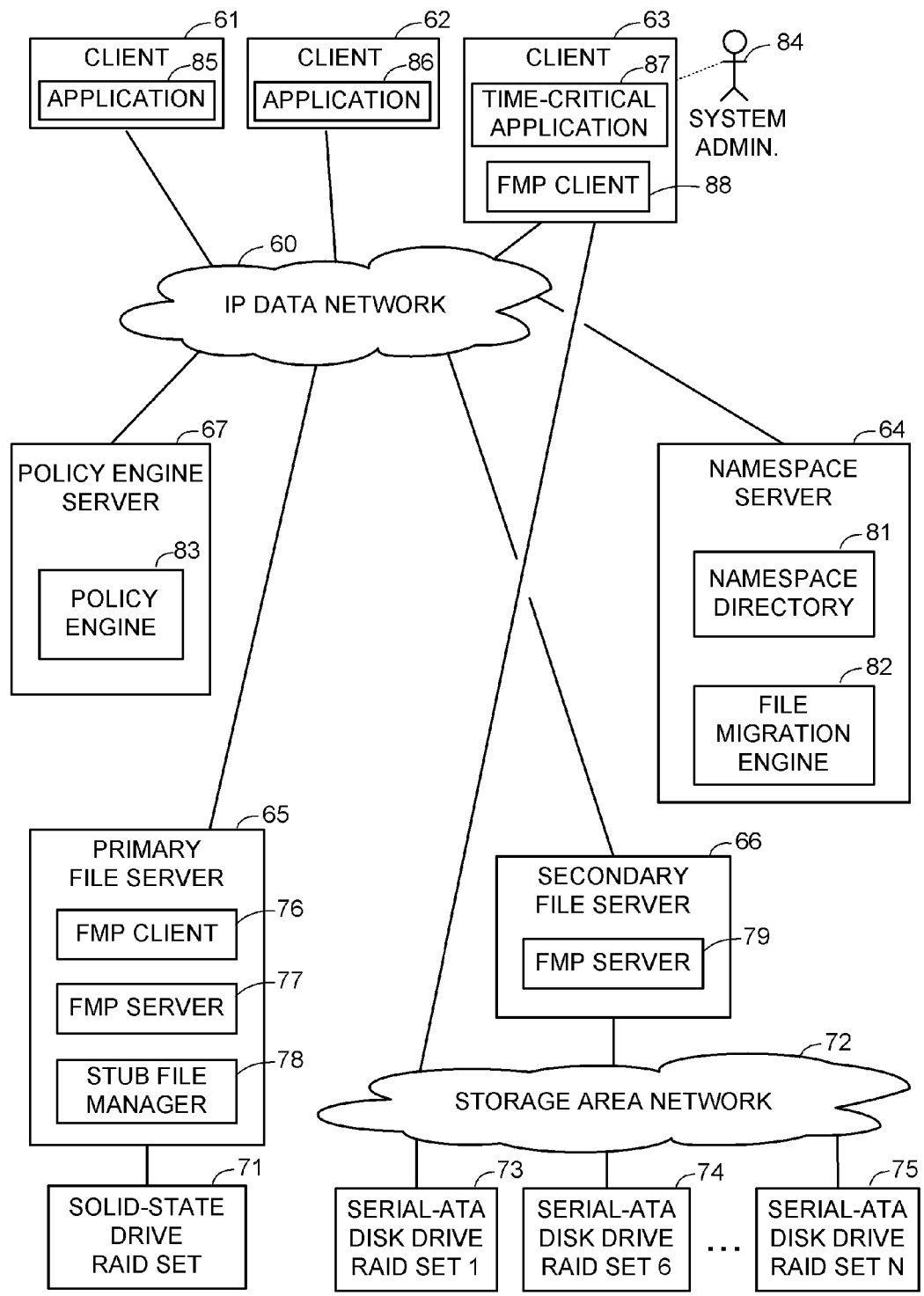
FIG. 2 shows a data processing system incorporating the present invention in a file server system including a namespace server, a primary file server, a secondary file server, and a policy engine.

FIG. 2 shows another data processing system incorporating the present invention. The data processing system of FIG. 2 includes an Internet Protocol (IP) data network 60 linking clients 61, 62, 63 to a namespace server 64, a primary file server 65, a secondary file server 66, and a policy engine server 67.

The primary file server 65 provides client access to files in a solid-state drive RAID set 71. The primary file server 65 has a stub file manager 78, which is similar to the stub file manager 49 introduced above with reference to FIG. 1.

The secondary file server 66 provides client access to files in a plurality of "N" SATA RAID sets 73, 74, 75, etc. A storage area network 72 links the SATA RAID sets 73, 74, 75 to the secondary file server 66. In addition, the client 63 is linked directly to the storage area network 72 to provide access to the SATA RAID sets 73, 74, 75, etc. using a file mapping protocol (FMP). To support the FMP protocol, the client 63 includes a FMP client 88, and the secondary file server includes a FMP server 79.

The primary file server 65 may also use the FMP protocol to create a corresponding stub file in the solid-state drive RAID set 71 for a specified file in one of the SATA RAID sets 73, 74, 75, etc. In this case, the stub file manager 78 uses a FMP client 76 in the primary file server 65 to obtain the file mapping metadata for the specified file from the FMP server 79 in the secondary file server 66. The primary file server 65 also has a FMP server 77 that may be invoked by the FMP client 88 of the client 63 of the system administrator 84 to obtain file mapping metadata of a specified file from the corresponding stub file in the solid-state drive RAID set 71 in order to directly access the file data in one of the SATA RAID sets 73, 74, 75 containing the specified file.

The namespace server 64 has a namespace directory 81 for directing a client requesting access to a file specified by a pathname in a virtual file system to a corresponding file in a respective one of the RAID sets 71, 73, 74, 75, etc. The namespace server 64 also includes a file migration engine 82, which is similar to the file migration engine 44 introduced in FIG. 1. Further details regarding the construction and operation of namespace server are found in Fridella et al. U.S. Patent Application Pub. 2007/0088702, incorporated herein by reference. Further details regarding migration of files between network file servers are found in Bober et al. U.S. Pat. No. 6,938,039 issued Aug. 30, 2005, incorporated herein by reference.

The policy engine server 67 includes a policy engine 83, which is similar to the policy engine 46 introduced in FIG. 1. Further details regarding the use of a policy engine server for migrating files between a primary network file server and a secondary network file server are found in Zimran et al. U.S. Patent Application Pub. No. 2007/0179990 published Aug. 2, 2007, incorporated herein by reference.

In general, the system of FIG. 2 operates in a similar fashion to the system of FIG. 1 for read-write access to files by the client applications 85, 86, 87. In a preferred implementation, when a file is created, the metadata and the data of the file are committed to a SSD file system. When a file is closed and a no-activity timer expires, the file is moved from the SSD file system to a selected one of the SATA file systems. By using the SSD as a write buffer, the movement of files from the SSD file system to selected SATA file systems is scheduled and done efficiently using respective concurrent write threads of the file migration engine for moving files from the SSD file system to selected SATA file systems.

To exploit the different relative advantages and disadvantages of SSD and SATA storage, the file mapping metadata of files having multiple file system data blocks is changed as these files are migrated from SSD to SATA storage. Because SSD storage has no performance penalty for seeking data or due to data de-fragmentation, allocation of SSD file system data blocks is done very quickly by simply removing a free block from a free block list. In contrast, because SATA storage has a performance penalty for seeking data and due to data de-fragmentation, the file system blocks for files having multiple file system blocks are allocated in such a way as to avoid data de-fragmentation in the SATA storage. Data de-fragmentation is avoided if possible by allocating contiguous free file system data blocks in the SATA storage to the extent of data in the file. If contiguous free file system data blocks in the SATA storage are allocated to the extent of data in the file, then the file data can be quickly streamed from the SSD RAID set to the SATA RAID set selected as the target of the file migration.

In general, the logical extent of a file will map to a series of extents of file system data blocks in the logical volume of the SATA RAID set, and a separate streaming operation will occur for each extent in the series. By using the SSD as a write buffer, data blocks in the SATA file system can be allocated and the streaming operations can be set up in advance while other files in the SSD file system and in the SATA file systems are being accessed, and then the streaming operations can be performed quickly. This is important because the speed of writing to the SATA storage is much slower than the speed of writing to the SSD storage, yet the speed of writing to the SATA storage should not significantly impact the performance of access to the SSD file system.

Due to the relatively high cost of the SSD, its high speed access capability should be fully exploited when it is not being used as a write buffer for migrating new files. One way of increasing the utilization of the SSD is to create or retain, in the SSD, corresponding stub files containing file mapping metadata for certain files that have been moved from the SSD tier to the SATA tier and that are likely to be accessed with some frequency after the migration. The file mapping metadata in a corresponding stub file in the SSD maps the data blocks in the extent of the file to corresponding logical block addresses of storage in the SATA logical volume containing the file.

For example, in response to a request from a client for access to data of such a file after the file has been migrated to a SATA file system, then the data of the file is accessed from the SATA file system without recalling the file data back to the SSD file system. At this time, if such a corresponding stub file is found in the SSD file system, then the file mapping metadata for accessing the file data from the SATA file system is read from the corresponding stub file and used for accessing the file data in the SATA file system. At this time, if such a corresponding stub file is not found in the SSD file system, then such a corresponding stub file is created in the SSD file system. Therefore, a series of read and write operations may be performed more quickly upon the file after movement of the file to the SATA file system, while conserving the relatively expensive storage space of the SSD file system, by accessing the file mapping metadata in the corresponding stub file in the SSD file system, and using this file mapping metadata to read data from or write data to the file in the SATA file system.

It is also possible to classify a newly created file as a file that is likely to be accessed with some frequency some time after its creation so that a corresponding stub file is more quickly created or more easily retained in the SSD file system once the newly created file is moved from the SSD file system to a SATA file system. For example, a special file name or a certain attribute of the file may indicate that the file is used by an application that periodically reads or writes to the file with a sufficient frequency that the entire file should be retained in the SSD file system, or the file should have an extended grace period of no activity after it is closed before the file is moved from the SSD file system to a SATA file system, or that a corresponding stub file should be created or retained in the SSD file system upon moving the file from the SSD file system to the SATA file system. Due to the relatively high cost of SSD, only a limited number of newly created application files should be allowed to remain in the SSD file system. However, more application files having special names or attributes may be given an extended grace period of no activity after they are closed before they are moved from the SSD file system to a SATA file system.

A newly created file in the SSD file system may have an access frequency indicating that a corresponding stub file for the newly created file should be created or retained in the SSD file system upon moving the newly created file from the SSD file system to the SATA file system. For example, absent a special file name or file attribute indicating that a corresponding stub file should be created or retained upon moving the file from the SSD file system to the SATA file system, a corresponding stub file is not created or retained in the SSD file system upon moving the file from the SSD file system to the SATA file system unless the file is created and then read before the file is moved from the SSD file system to the SATA file system. The assumption here is that certain metadata intensive applications, such as the ClearCase (Trademark) application development and Oracle (Trademark) database applications, discourage caching the data set for re-use later. Thus, in the typical case, a file is accessed for metadata operations during data set creation and the file is not likely to be accessed frequently again for read or write operations. In an atypical case, a file is accessed for a read operation shortly after dataset creation, and in this atypical case the file is likely to be accessed again (after movement from the SSD file system to the SATA file system) for more read or write operations.

In one specific implementation, the storage array is data storage of a file server, and the movement of files from a SSD file system to multiple SATA file systems is performed by a file mover API in the file server under control of a policy engine (PE) external to the file server. The file mover API uses a bulk file movement method, typically used by backup applications, to speed up the movement of the file from the SSD file system to a selected one of the multiple SATA file systems.

Figure 3:
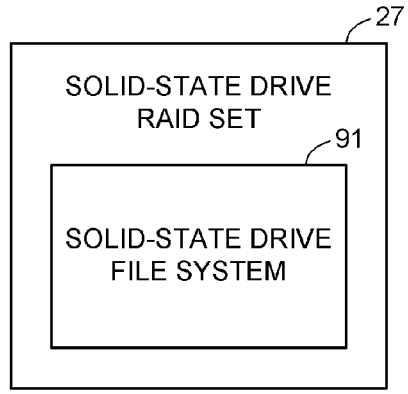
FIG. 3 shows a solid-state drive file system stored in a solid-state drive RAID set introduced in FIG. 1.

FIG. 3, for example, shows that the solid-state drive RAID set 27, as introduced in FIG. 1, contains a solid-state drive file system 91. As further show in FIG. 4, the solid-state drive file system 91 includes a directory 92 storing a directory entry 93 including a file name 93. The directory entry 93 points to a specified file 94 in the solid-state drive file system. The specified file 94 includes file attributes 95, file mapping metadata 96, and file system data blocks 97. The file mapping metadata 96 maps a logical extent of the file data of the specified file 94 to the logical block addresses of the file system data blocks 97 containing the file data. For example, the solid-state drive file system 91 is a UNIX® based file system, and the file mapping metadata 96 consists of block pointers in an inode of the specified file 94, and block pointers in indirect blocks of the specified file.

Figure 5:
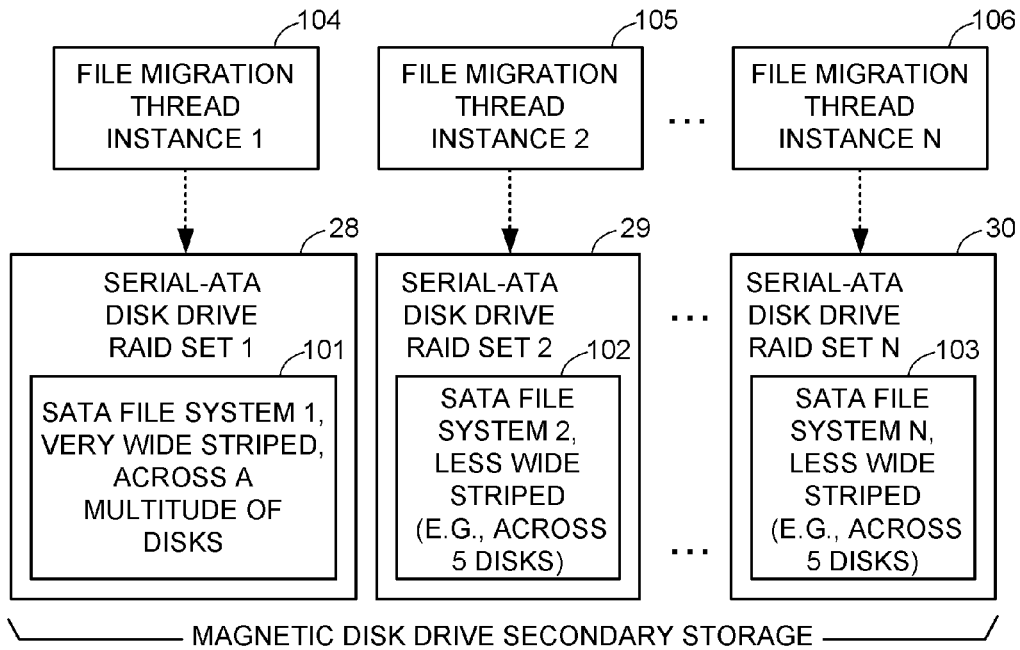
FIG. 5 shows respective SATA file systems in the Serial-ATA disk drive RAID sets introduced in FIG. 1, and respective file migration thread instances for migrating files to the SATA file systems.

As shown in FIG. 5, each serial-ATA disk drive RAID set 28, 29, . . . , 30 contains a respective SATA file system 101, 102, . . . , 103. Each SATA file system is configured for a certain application access pattern, ranging from one very wide striped file system 101 for large sequentially accessed files to a number of less wide striped file systems 102, . . . , 103 for smaller and more randomly accessed files. Based on the expected application access pattern, as indicated by the file size and any special file name, special file attribute, or access history since creation of the file, the policy engine decides which SATA file system should be the target of each file movement from the SSD file system. The objective here is to match the configuration of the selected SATA file system to the expected access pattern of the file and to load balance among the number of SATA file systems for the smaller and more randomly accessed files in order to prevent as much as possible any contention in access to the SATA file systems and prevent random disk access as much as possible. When this is done, in the ideal case, the SATA file systems are accessed in parallel by a respective thread for each SATA file system sequentially reading data from or writing data to each SATA file system during uninterrupted concurrent streaming of data to and from each SATA file system.

Figure 6:
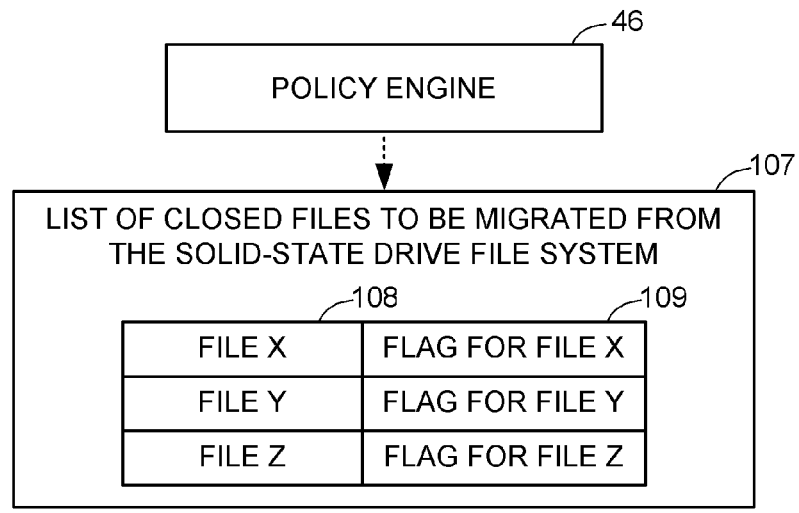
FIG. 6 shows a list of closed files, which is compiled by the policy manager for scheduling migration of files and creation of stub files upon migration of certain files from the solid-state drive file system to selected SATA file systems.

For use with a SSD primary file system and a SATA secondary file system, the policy engine uses a very aggressive policy of moving the files from the primary file system to the secondary file system in a very short time after a newly created file is closed and has no longer been accessed. For example, as shown in FIG. 6, the policy engine 46 compiles a list 107 of closed files to be moved from the SSD file system to the SATA file system if a closed file on the list is not accessed before expiration of the grace period for the file. Each entry of the list 107 includes a pointer 109 to the file and a respective flag 109 for the file. Files on this list are flagged if the file was read from since creation or if the file has a special name or attribute indicating that the file should be replaced with a corresponding stub file upon moving the file from the SSD file system to the SATA file system. For each file on the list, as the current time approaches the expiration of the file's grace period, the policy engine selects a SATA file system to be the target of the impending movement of the file from the SSD file system to the SATA file system based on the number of threads used for the movement of the files as well as co-locality of files on the SATA file systems, and then the policy engine invokes the file mover API to begin the file movement process.

The policy engine can also be responsible for responding to a successful acknowledgement of file movement from the file mover API by deleting the original file in the SSD file system, changing an entry in a namespace directory or creating a symbolic link in the SSD file system pointing to the file in the selected SATA file system, and initiating creation of a corresponding stub file in the SSD file system when the file has been flagged for creation of a corresponding stub file upon moving the file from the SSD file system to the SATA file system.

In another specific implementation, less time critical performance applications are given direct read access to files in the SATA file system without reading file mapping metadata from a corresponding stub file in the SSD file system, while more time critical performance applications are given pass-through read access to files in the SATA file system using file mapping metadata read from the corresponding stub file in the SSD file system. This is desirable when the access capability of the SSD file system is fully used, yet the access capability of the SATA file system is not fully used. This is also easy to implement for read-only files.

For read-write files, however, there should be a mechanism for concurrency control to avoid conflict between access by the less time critical performance applications and the more time critical performance applications. For example, an application process obtains a read or write lock upon the file from a lock manager at a common point in the access path of the less time critical performance applications and the access path of the more time critical performance applications. For example, the common point in the access paths is a symbolic link in the SSD file system or a directory entry in a namespace server for directing the application process to either the corresponding stub file in the SSD file system or to the file in a SATA file system. The common point in the access path can also be responsible for synchronizing any changes to the file attributes and file mapping metadata that are duplicated between the file in the SATA file system and the corresponding stub file in the SSD file system. For example, if a process of a less critical application successfully deletes or moves the file in the SATA file system, then the corresponding stub file in the SSD file system is deleted or modified automatically. The common point in the access path can also be responsible for initiating creation of a corresponding stub file when a more time critical application is requesting access to a file that has been moved to a SATA file system and that does not have a corresponding stub file in the SSD file system.

Figure 4:
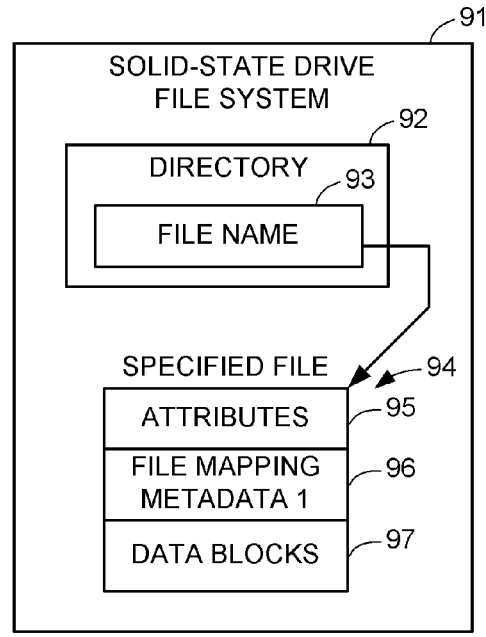
FIG. 4 shows a directory and a specified file in the solid-state drive file system introduced in FIG. 3.
Figure 7:
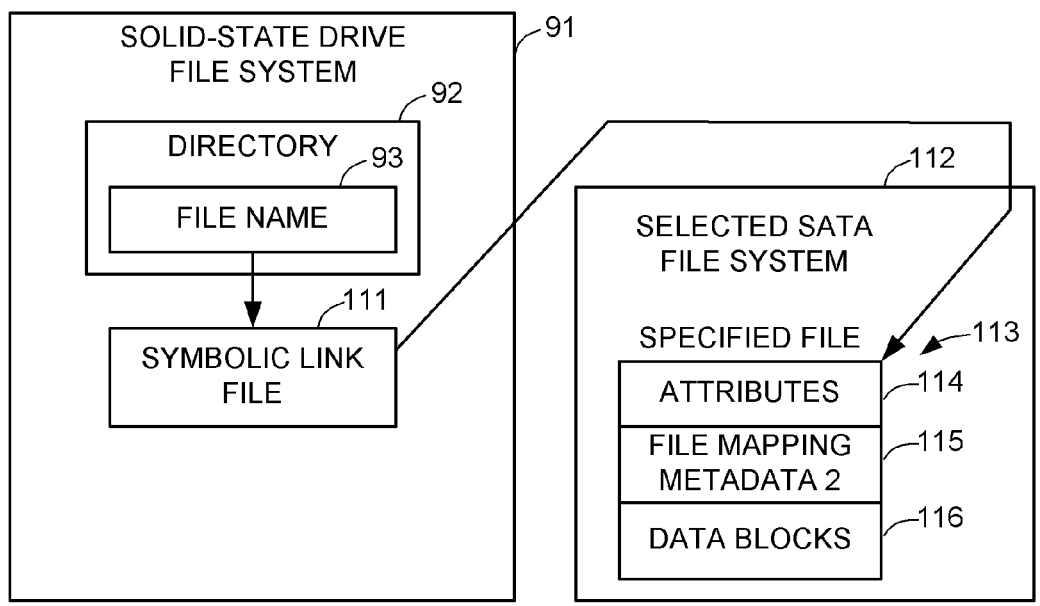
FIG. 7 shows the result of migrating the specified file of FIG. 4 from the solid-state drive file system of FIG. 4 to a selected STAT file system shown in FIG. 6.

FIG. 7, for example, shows the result of migration of the specified file from the solid-state drive file system 91 of FIG. 4 to a selected SATA file system 112 in FIG. 7. In this case, the original specified file (94 in FIG. 4) in the solid-state drive file system 91 is replaced with a symbolic link file 111 linked to the directory entry 93 including the original file name. The symbolic link file 111 points to the specified file 113 that is now in the selected SATA file system 112. Thus, as a result of the migration, the specified file 113 in the selected SATA file system 112 may have attributes 113, file mapping metadata 115, and data blocks 116 that are different from the attributes (95 in FIG. 4), file mapping metadata (96 in FIG. 4), and data blocks (97 in FIG. 4) of the original file (94 in FIG. 4), although the data blocks 116 of the migrated file 113 will include a copy of the original data that was in the data blocks (97 in FIG. 4) of the original file (94 in FIG. 3).

Figure 8:
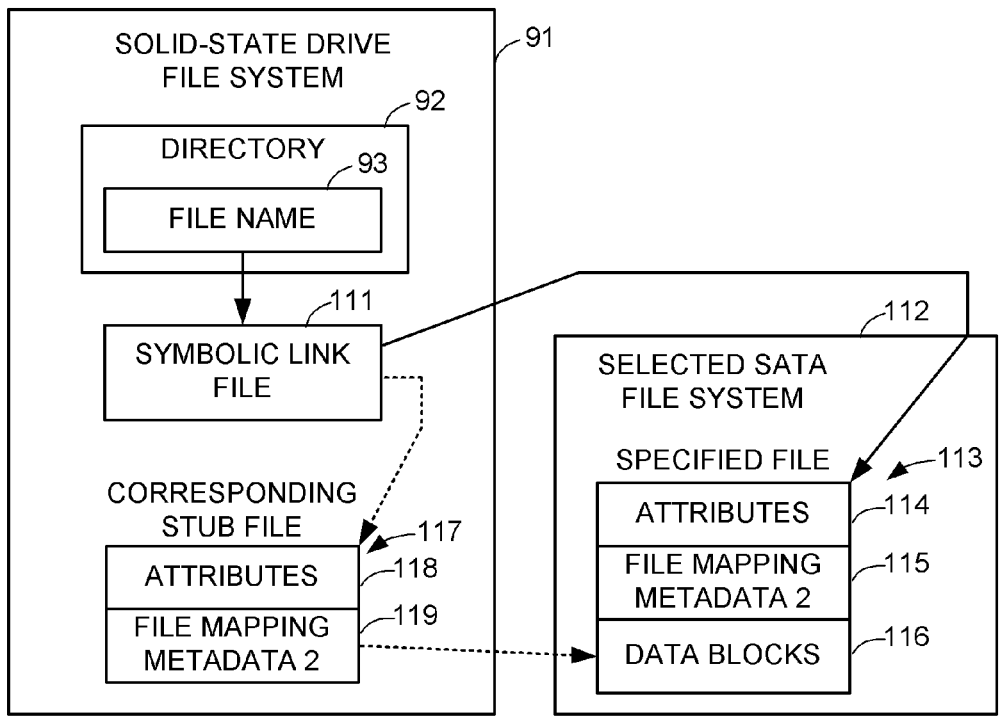
FIG. 8 shows the result of creating a corresponding stub file in the solid-state drive file system for the specified file in the selected SATA file system of FIG. 7.

FIG. 8 shows the result of creating a corresponding stub file 117 in the solid state drive file system 91. The stub file 117 includes attributes 118 that are similar to the attributes 114 of the specified file 113 in the selected SATA file system 112, and file mapping metadata 119 that maps the extent of the file to the logical block addresses of the data blocks 116 in the selected SATA file system 112. The symbolic link file 111 also points to the corresponding stub file 117 in the solid-state drive file system 91. For example, the symbolic link file 111 is provided with a field including a non-zero inode pointer that points to the inode of the corresponding stub file when the solid-state drive file system 91 contains a corresponding stub file.

Figure 9:
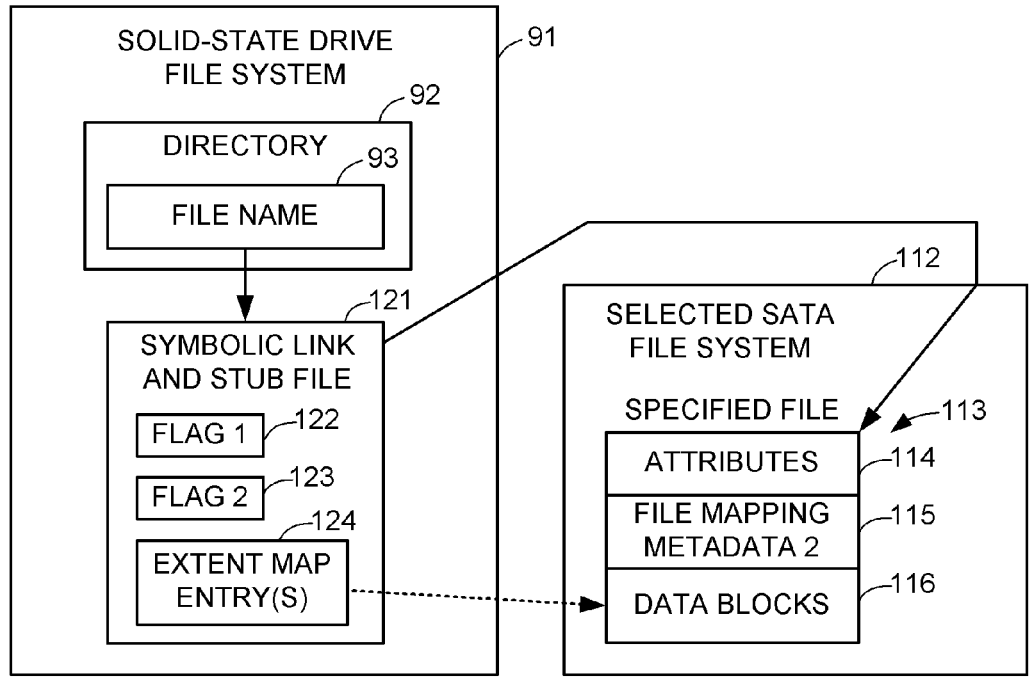
FIG. 9 shows an alternative way of producing a corresponding stub file in the solid-state drive file system by modifying a corresponding symbolic link file.

FIG. 9 shows that for the case of small file or a file having no more than a few extents of contiguous logical data blocks in the selected SATA file system 112, the original specified file in the solid-state drive file system can be replaced with a symbolic link file 121 that also is the stub file corresponding to the specified file 113. For example, the symbolic link file 121 includes a first flag 122 for indicating whether or not the solid-state drive file system 91 includes a corresponding stub file for the file having the file name in the directory entry 93, and a second flag 123 for indicating whether the symbolic link file includes either a pointer to the corresponding stub file or includes one or more extent map entries 124 pointing to data blocks 116 of the specified file. If the symbolic link file includes one or more extent map entries 124, then the symbolic link file 121 is the corresponding stub file for the specified file 113.

Figures 10, 11:
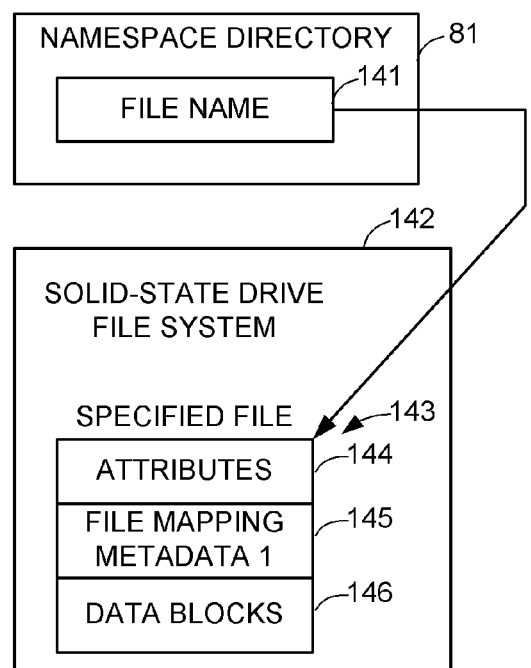
FIG. 10 shows an extent map for a file.
FIG. 11 shows a specified file in the solid-state drive file system linked to the namespace directory introduced in FIG. 2.

FIG. 10 shows an extent map 130 containing the file mapping metadata for a specified file. By including extent map entries in the corresponding stub file instead of conventional indirect file system blocks, it is possible to reduce the amount of solid-state drive storage needed for storing the file mapping metadata of specified files that have been laid-out or defragmented so that their file data comprises only a few extents in the selected SATA file system. The extent map 130 includes a list of variable-length extents, and specifies for each extent, a file offset, logical block address, length, and status. Each extent is a range of contiguous logical block addresses of file data. The length indicates the number of data blocks in the extent. The status, for example, specifies whether or not the extent is valid for reading and writing, valid for read only, invalid, or is a hole. For many applications, the status field is not needed. The entries in the extent map, for example, are ordered by file offset, so that the extent map provides an efficient mapping of a specified file offset to a corresponding logical block address. For example, the logical data block size is the standard disk sector size of 512 bytes, and the minimum extent length is sixteen logical data blocks, for a total of 8 kilobytes, and the length of each extent is an integer multiple of 8 kilobytes. In this case, the amount of data in each extent is eight kilobytes times the number in the extent map length field for the extent.

FIG. 11 shows the result of creating a new specified file 143 in the data processing system of FIG. 2. As shown in FIG. 11, an entry 141 in the namespace directory 81 contains a file name and points to the specified file 143 in the solid-state drive file system 142. (The solid-state drive file system is contained in the solid-state drive RAID set 71 of FIG. 2.) The specified file 143 includes attributes 144, file mapping metadata 145, and data blocks 146. The file mapping metadata 145 is comprised of block pointers in an inode for the specified file 143 and indirect blocks of the specified file. These block pointers point to the file system data blocks 146 in the solid-state drive file system 142.

Figure 12:
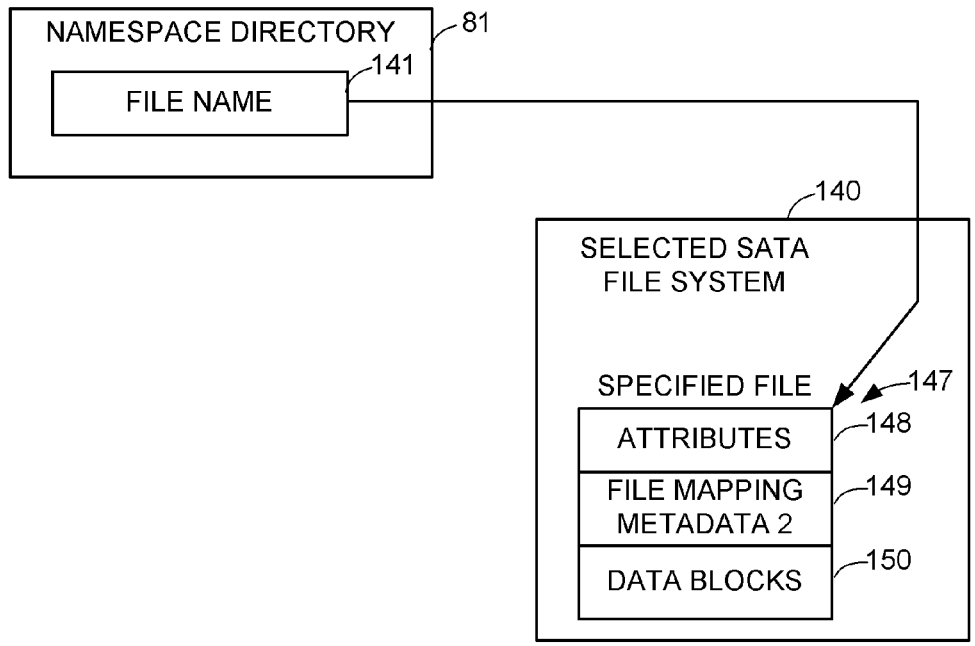
FIG. 12 shows the result of migrating a specified file introduced in FIG. 10 from the solid-state drive file system to a selected SATA file system.

FIG. 12 shows the result of migrating the specified file from the solid-state drive file system to a selected SATA file system 140. (The selected SATA file system is contained in a respective one of the serial-ATA disk drive RAID sets 72, 73, . . . , 75 in FIG. 2.) In this case, the directory entry 141 containing the name of the specified file is changed to point to the specified file 147 in the selected SATA file system 140.

Figure 13:
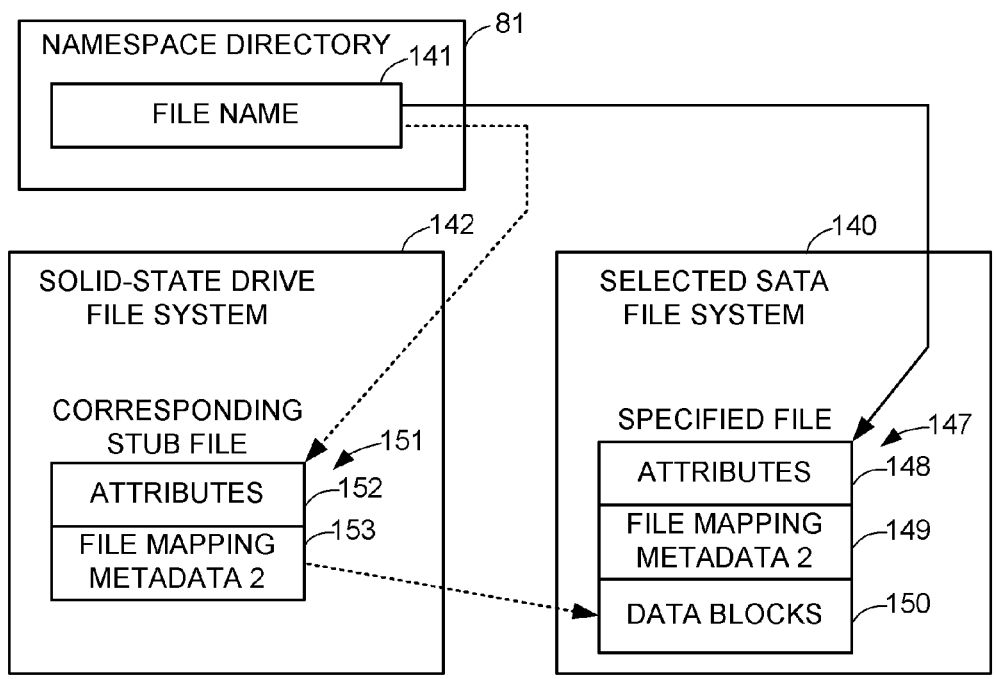
FIG. 13 shows the result of creating a corresponding stub file in the solid-state drive file system for the specified file in the selected SATA file system of FIG. 12.

FIG. 13 shows the result of creating a corresponding stub file 151 after the specified file 147 has been migrated to the selected SATA file system 140. The stub file 151 includes attributes 152 of the specified file 147 and file mapping metadata 153 mapping the extent of the file to the logical block addresses of the file system data blocks 150 of the specified file in the selected SATA file system 140. The directory entry 141 in the namespace directory 81 also is updated to indicate that the specified file has a corresponding stub file in the solid-state drive file system 141 and to point to the corresponding stub file. For example, the directory entry 141 is provided with a field including a non-zero inode pointer that points to the inode of the corresponding stub file when the solid-state drive file system 142 contains a corresponding stub file.

Figure 14:
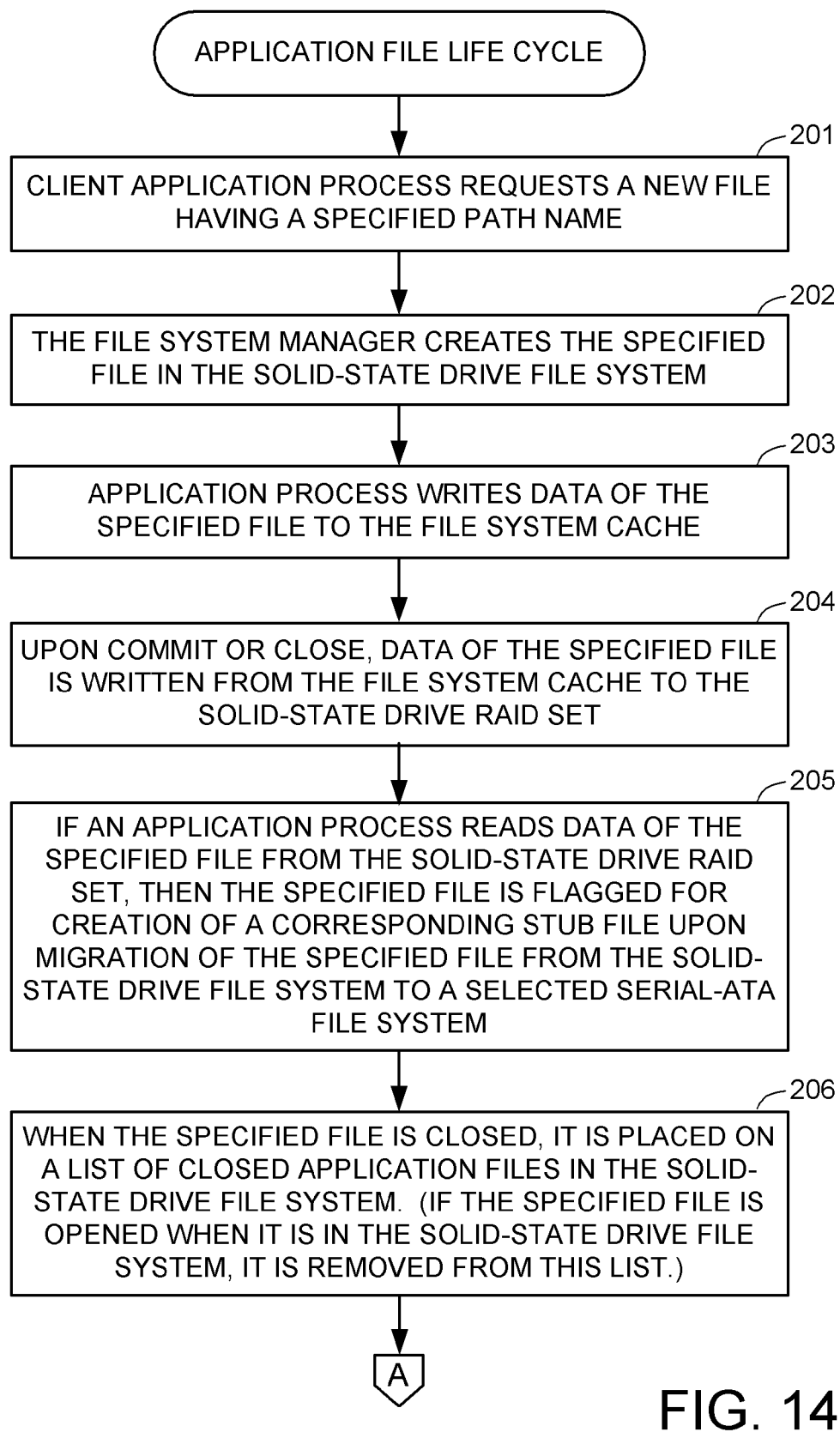
FIGS. 14, 15 and 16 together comprise a flowchart of the life cycle of an application file created in the solid-state drive file system.

FIG. 14 shows a first sheet of a flowchart of the life cycle of an application file in the data processing system of FIG. 1 or FIG. 2. In a first step 201, a client application process requests a new file having a specified path name. In step 202, the file system manager (38 in FIG. 1) of the solid-state drive file system creates the specified file in the solid-state drive file system. In step 203, the application process writes data of the specified file to the file system cache (43 in FIG. 1). In step 204, upon commit or close upon the specified file, data of the specified file is written from the file system cache to the solid-state drive RAID set (27 in FIG. 1). In step 205, if an application process reads data of the specified file from the solid-state drive RAID set, then the specified file is flagged for creation of a corresponding stub file upon migration of the specified file from the solid-state drive file system to a selected serial-ATA file system. In step 206, when the specified file is closed, it is placed on a list (107 in FIG. 6) of closed application files that are in the solid-state drive file system. (If the specified file is opened when it is in the solid-state drive file system, then the specified file is removed from this list.) Execution continues from step 206 of FIG. 14 to step 207 of FIG. 15.

Figure 15:
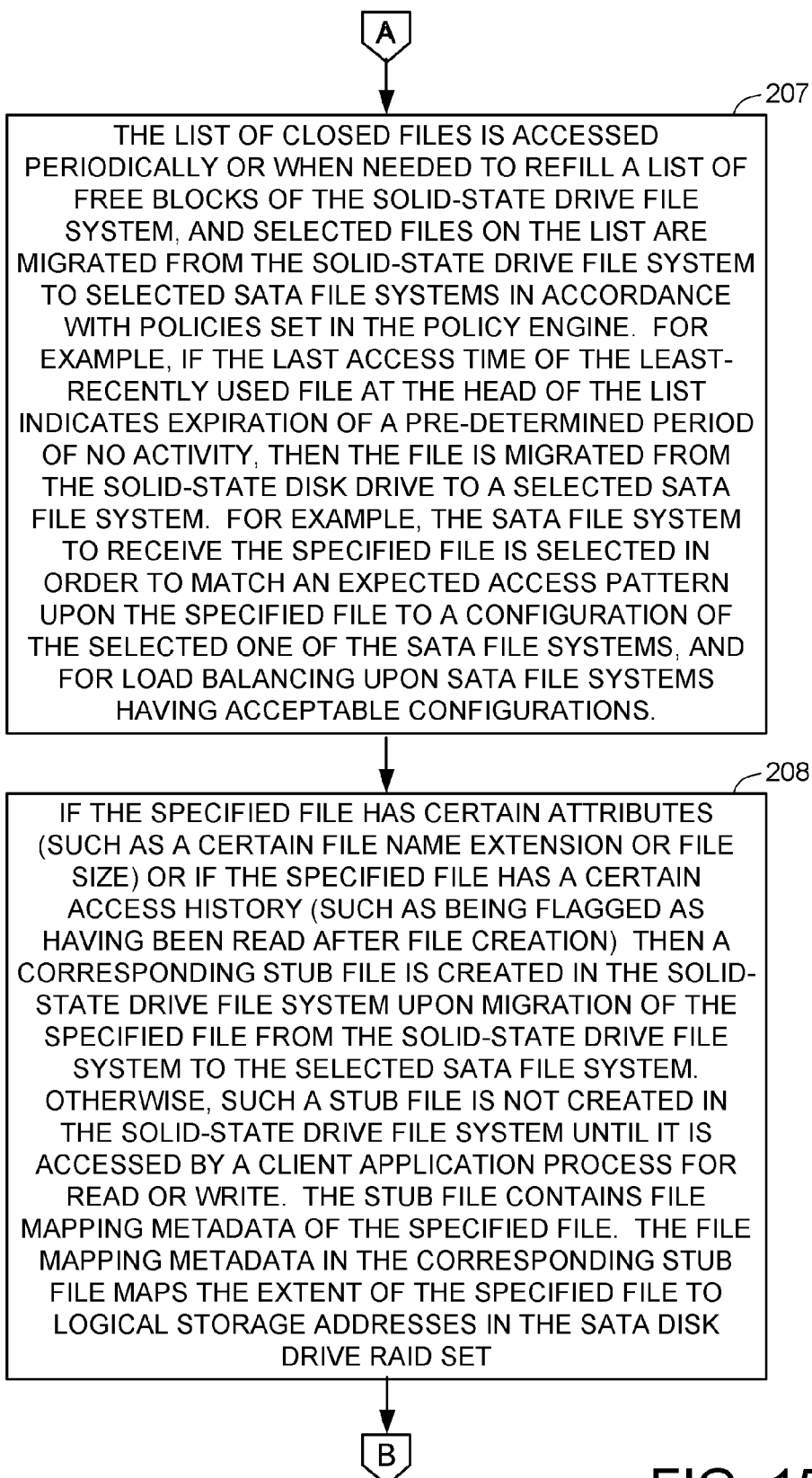

In step 207 of FIG. 15, the list of closed files is accessed periodically or when needed to refill a list of free file system blocks of the solid-state drive file system, and selected files on this list are migrated from the solid-state drive file system to selected serial-ATA file systems in accordance with policies set in the policy engine. For example, if the last access time of the least-recently used file appearing at the head of the list indicates expiration of a pre-determined period of no activity, then this file is migrated from the solid-state drive file system to a selected serial-ATA file system. For example, the serial-ATA file system to receive the specified file is selected in order to match an expected access pattern upon the specified file to a configuration of the selected one of the serial-ATA file systems, and for load balancing upon serial-ATA file systems having acceptable configurations.

In step 208, if the specified file has certain attributes (such as a certain file name extension or file size) or if the specified file has a certain access history (such as being flagged as having been read after file creation) then a corresponding stub file is created in the solid-state drive file system upon migration of the specified file from the solid-state drive file system to the selected serial-ATA file system. Otherwise, such a corresponding stub file is not created in the solid-state drive file system until the specified file in the selected serial-ATA file system is accessed by a client application process for read or write. The corresponding stub file contains file mapping metadata of the specified file. The file mapping metadata in the corresponding stub file maps the extent of the specified file to logical storage addresses in the selected serial-ATA disk drive RAID set. Execution continues from step 208 of FIG. 15 to step 209 of FIG. 16.

Figure 16:
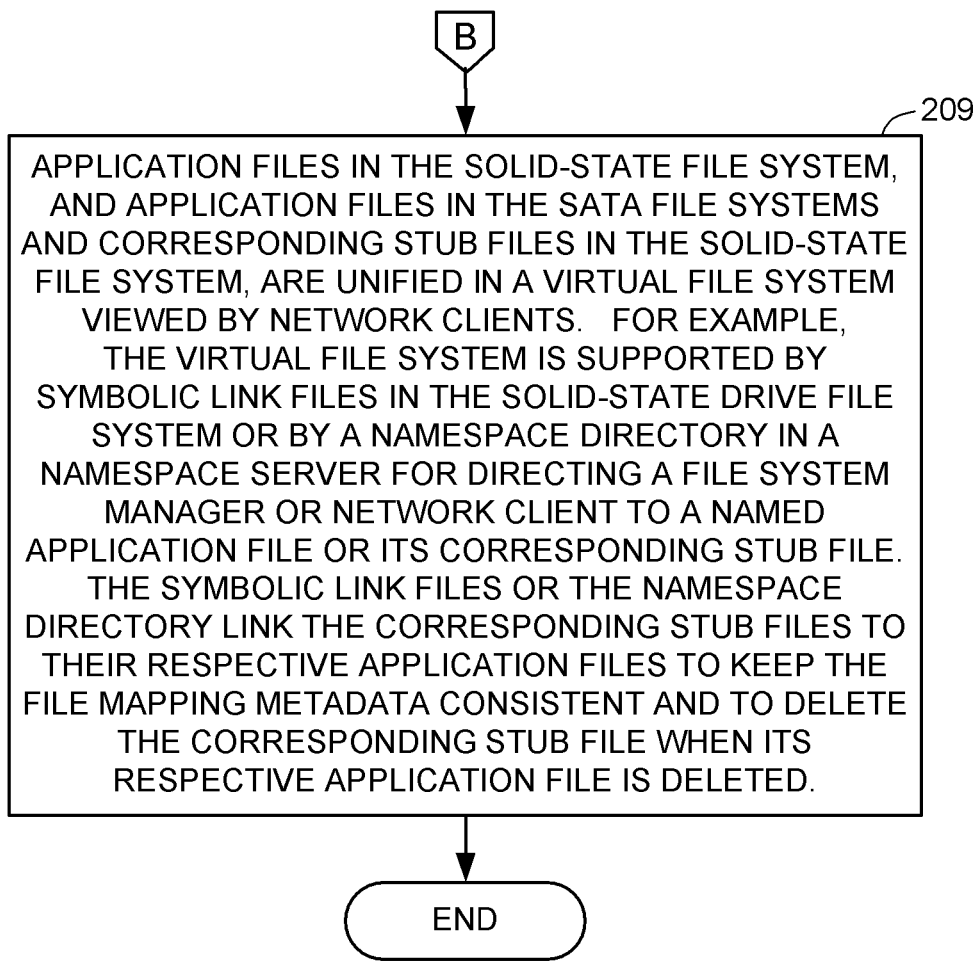

In step 209 of FIG. 16, application files in the solid-state file system, and application files in the SATA file systems and corresponding stub files in the solid-state file system, are unified in a virtual file system viewed by network clients. For example, the virtual file system is supported by symbolic link files in the solid-state drive file system (e.g., in the data processing system of FIG. 1) or by a namespace directory in a namespace server (e.g., in the data processing system of FIG. 2) for directing a file system manager or a network client to a named application file or its corresponding stub file. The symbolic link files or the namespace directory link the corresponding stub files to their respective application files to keep the file mapping metadata consistent and to delete the corresponding stub file when its respective application file is deleted.

Figure 17:
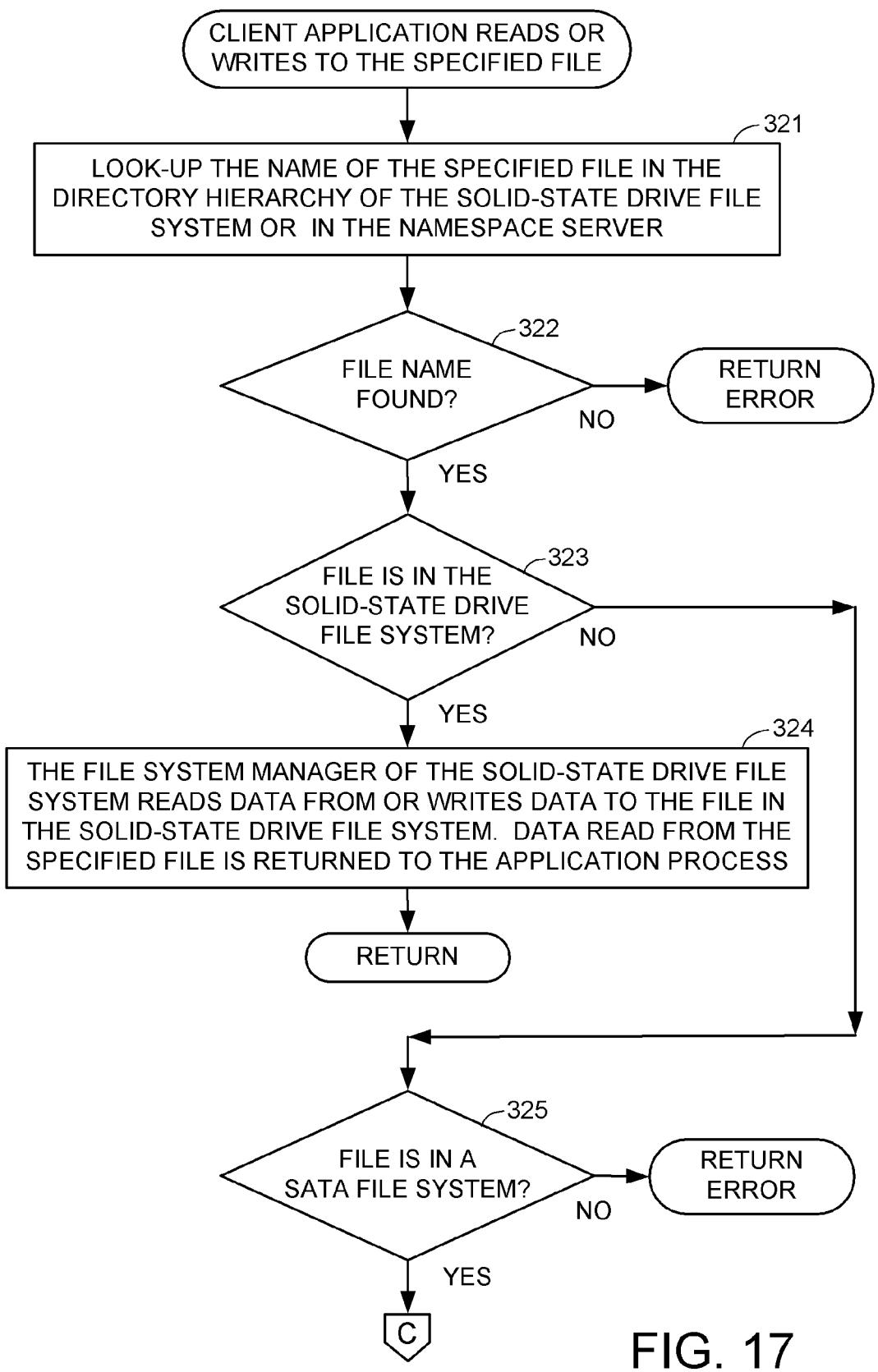
FIGS. 17, 18, and 19 together comprise a flowchart of read or write access of a client application to a specified file in the data processing network of FIG. 1 or FIG. 2.

FIG. 17 shows the first sheet of a flowchart of read or write access of a client application to a specified file in the data processing network of FIG. 1 or FIG. 2. The file is specified by a file name. In a first step 321, the name of the specified file is looked up in the directory hierarchy of the solid-state drive file system or in the namespace server. In step 322, if the file name is not found, then an error message is returned to the client application. Otherwise, execution continues to step 323.

In step 323, if the directory entry containing the file name indicates that the file is in the solid-state drive file system, then execution continues to step 324. In step 324, the client application reads or writes to the specified file in the solid-state drive file system, and then execution returns. In step 323, if the specified file is not found in the solid-state drive file system, then execution braches to step 325. In this case, the specified file should be in a serial-ATA file system. In step 325, if the specified file is not found in a serial-ATA file system, then an error message is returned to the client. Otherwise, if the specified file is found in a serial-ATA file system, then execution continues to step 326 in FIG. 18.

Figure 18:
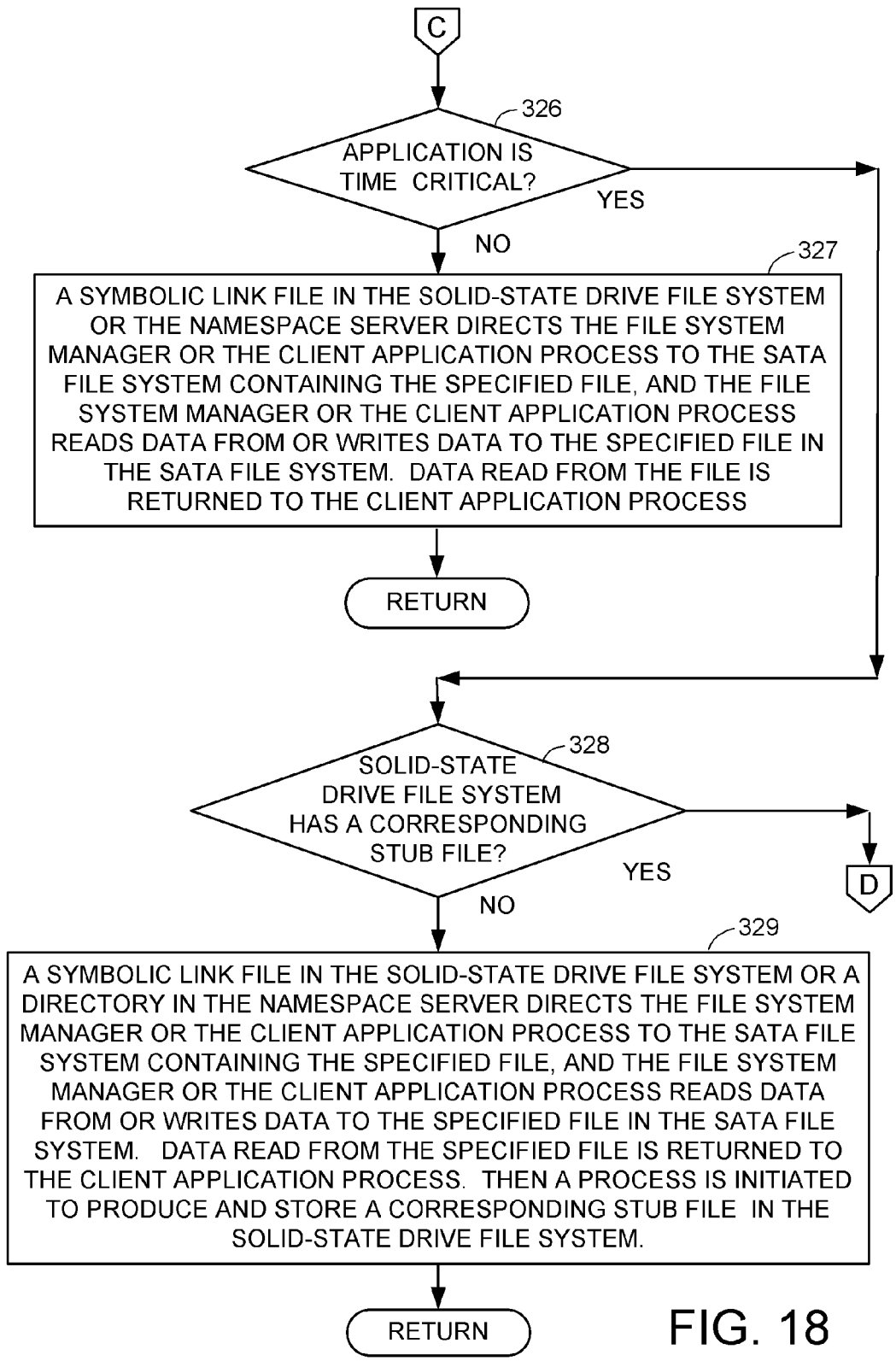

In step 326 of FIG. 18, if the client application is not time critical, then execution continues to step 327. In step 327, a symbolic link file in the solid-state drive file system or the namespace server directs the file system manager or the client application process to the serial-ATA file system containing the specified file, and the file system manager or the client application process read data from or writes data to the specified file in the serial-ATA file system. Data read from the file is return to the client application process, and execution returns.

In step 326, if the client application is time critical, then execution continues from step 326 to step 328. In step 328, if the solid-state drive file system does not have a corresponding stub file, then execution continues to step 329. In step 329, a symbolic link file in the solid-state drive file system or a directory entry in the namespace server directs the file system manager or the client application process to the serial-ATA file system containing the specified file, and the file system manager or the client application process reads data from or writes data to the specified file in the serial-ATA file system. Data read from the specified file is returned to the client application process. Then a process is initiated to produce and store a corresponding stub file in the solid-state drive file system, and execution returns.

Figure 19:
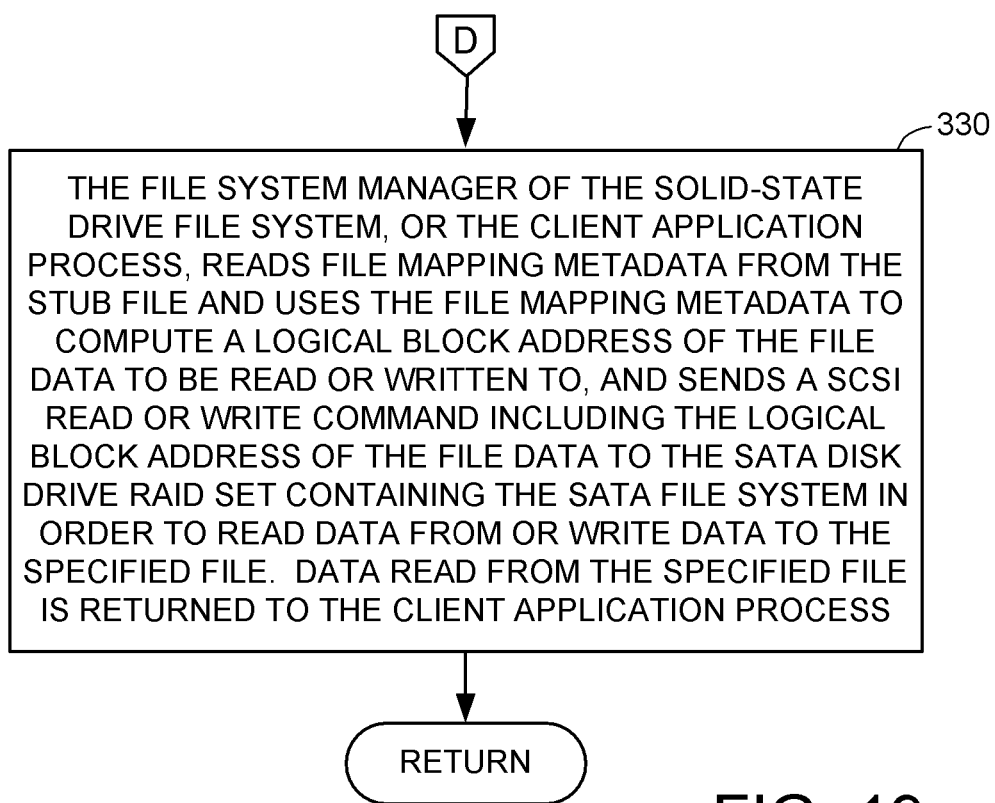

In step 328, if the solid-state drive file system has a corresponding stub file, then execution continues to step 330 of FIG. 19. In step 330, the file system manager of the solid-state drive file system or the client application process reads file mapping metadata from the stub file and uses the file mapping metadata to compute a logical block address of the file data to be read or written to, and sends a SCSI read or write command including the logical block address of the file data to the serial-ATA disk drive RAID set containing the serial-ATA file system in order to read data from or write data to the specified file. Data read from the specified file is returned to the client application process. After step 330, execution returns.

In view of the above, there has been described a file server system having solid-state drive primary storage and magnetic disk drive secondary storage. The file server system aggressively moves newly created files from the primary storage to selected file systems in the secondary storage to match expected access patterns upon the files to different configurations of the file systems and for load balancing upon the file systems in the secondary storage. Sometimes the file server system splits migration of file mapping metadata data from the migration of the file data between the primary storage and the secondary storage. Upon read access to a file that has been moved to the secondary storage, or upon migration of a newly created file that was read in primary storage after creation, a corresponding stub file containing file mapping metadata is created in the primary storage. The file mapping metadata in the stub file maps the extent of the file to logical storage addresses in the secondary storage. Therefore, after a specified file has been moved to the secondary storage and a corresponding stub file has been created in the primary storage, the file is quickly accessed by an application process for read or write by reading the file mapping metadata from the stub file to obtain a logical block address in the secondary storage, and then reading or writing data at the logical block address in the secondary storage. In this fashion, the SSD is especially suited for servicing metadata intensive applications using a fast "cache" file system, such as ClearCase (Trademark) application development, Oracle (Trademark) database, and e-mail applications.

What is claimed is:

1. A computer-implemented method of providing a client with access to a specified file stored in tiered storage including solid-state drive primary storage and magnetic disk drive secondary storage, said computer-implemented method comprising the steps of:
   (a) creating a specified file in the solid-state drive primary storage; and
   (b) after the specified file has been created in the solid-state drive primary storage, moving the specified file from the solid-state drive primary storage to the magnetic disk drive secondary storage, and creating a corresponding stub file in the solid-state drive primary storage, the corresponding stub file containing file mapping metadata of the specified file in the magnetic disk drive secondary storage, the file mapping metadata of the specified file in the corresponding stub file mapping an extent of data in the specified file to a logical block address of magnetic disk drive secondary storage containing data of the specified file in the magnetic disk drive secondary storage; and thereafter
   (c) responding to a request from the client for reading data of the specified file by reading the file mapping metadata from the corresponding stub file to obtain the logical block address of the magnetic disk drive secondary storage containing the data of the specified file, and reading the data of the specified file from the logical block address of the magnetic disk drive secondary storage containing the data of the specified file, and returning to the client the data of the specified file read from the logical block address of the magnetic disk drive secondary storage containing the data of the specified file,
   wherein the corresponding stub file is created in the solid-state drive primary storage in response to read access to the specified file after the specified file has been moved from the solid-state drive primary storage to the magnetic disk drive secondary storage.

2. A computer-implemented method of providing a client with access to a specified file stored in tiered storage including solid-state drive primary storage and magnetic disk drive secondary storage, said computer-implemented method comprising the steps of:
   (a) creating a specified file in the solid-state drive primary storage; and
   (b) after the specified file has been created in the solid-state drive primary storage, moving the specified file from the solid-state drive primary storage to the magnetic disk drive secondary storage, and creating a corresponding stub file in the solid-state drive primary storage, the corresponding stub file containing file mapping metadata of the specified file in the magnetic disk drive secondary storage, the file mapping metadata of the specified file in the corresponding stub file mapping an extent of data in the specified file to a logical block address of magnetic disk drive secondary storage containing data of the specified file in the magnetic disk drive secondary storage; and thereafter
   (c) responding to a request from the client for reading data of the specified file by reading the file mapping metadata from the corresponding stub file to obtain the logical block address of the magnetic disk drive secondary storage containing the data of the specified file, and reading the data of the specified file from the logical block address of the magnetic disk drive secondary storage containing the data of the specified file, and returning to the client the data of the specified file read from the logical block address of the magnetic disk drive secondary storage containing the data of the specified file;
   creating a multiplicity of files in the solid-state drive primary storage, recording that some of the files in the solid-state drive primary storage have been read by an application, and upon moving each of the files from the solid-state drive primary storage to the magnetic disk drive secondary storage, checking whether there is a record that said each of the files has been read by an application, and in response to finding that there is a record for each of the files that has been read by an application, creating a corresponding stub file in the solid-state drive primary storage for said each of the files that has been read by an application.

3. A computer-implemented method of providing a client with access to a specified file stored in tiered storage including solid-state drive primary storage and magnetic disk drive secondary storage, said computer-implemented method comprising the steps of:
   (a) creating a specified file in the solid-state drive primary storage; and
   (b) after the specified file has been created in the solid-state drive primary storage, moving the specified file from the solid-state drive primary storage to the magnetic disk drive secondary storage, and creating a corresponding stub file in the solid-state drive primary storage, the corresponding stub file containing file mapping metadata of the specified file in the magnetic disk drive secondary storage, the file mapping metadata of the specified file in the corresponding stub file mapping an extent of data in the specified file to a logical block address of magnetic disk drive secondary storage containing data of the specified file in the magnetic disk drive secondary storage; and thereafter
   (c) responding to a request from the client for reading data of the specified file by reading the file mapping metadata from the corresponding stub file to obtain the logical block address of the magnetic disk drive secondary storage containing the data of the specified file, and reading the data of the specified file from the logical block address of the magnetic disk drive secondary storage containing the data of the specified file, and returning to the client the data of the specified file read from the logical block address of the magnetic disk drive secondary storage containing the data of the specified file;

maintaining a list of files that have been closed in the solid-state drive primary storage, and moving each file on the list from the solid-state drive primary storage to the magnetic disk drive secondary storage; and flagging certain files on the list for which corresponding stub files should be created in the solid-state drive primary storage upon moving the certain files from the solid-state drive primary storage to the magnetic disk drive secondary storage, and creating corresponding stub files in the solid-state drive primary storage for the certain files upon moving the certain files from the solid-state drive primary storage to the magnetic disk drive secondary storage, the corresponding stub files in the solid-state drive primary storage including file mapping metadata mapping data in extents of the certain files to logical block addresses of the magnetic disk drive secondary storage containing data of the certain files.

4. A file server system comprising:

solid-state drive primary storage;

magnetic disk drive secondary storage; and at least one processor coupled to the solid-state drive primary storage and coupled to the magnetic disk drive secondary storage for providing a client with access to files in the solid-state drive primary storage and for providing the client with access to files in the magnetic disk drive secondary storage;

wherein said at least one processor is programmed with a file migration engine program executable by said at least one processor to move a specified file from the solid-state drive primary storage to the magnetic disk drive secondary storage; and said at least one processor is further programmed with a stub file manager program executable by said at least one processor to create a corresponding stub file in the solid-state drive primary storage for the specified file, the corresponding stub file containing file mapping metadata of the specified file in the magnetic disk drive secondary storage, the file mapping metadata of the specified file in the corresponding stub file mapping an extent of data in the specified file to a logical block address of magnetic disk drive secondary storage containing data of the specified file in the magnetic disk drive secondary storage, and the stub file manager program is further executable by said at least one processor to respond to a request from the client for reading data of the specified file by reading the file mapping metadata from the corresponding stub file to obtain the logical block address of the magnetic disk drive secondary storage containing the data of the specified file, and said at least one processor is further programmed to read the data of the specified file from the logical block address of the magnetic disk drive secondary storage containing the data of the specified file, and to return to the client the data of the specified file read from the logical block address of the magnetic disk drive secondary storage containing the data of the specified file, wherein said at least one processor is programmed to create the corresponding stub file in the solid-state drive primary storage in response to read access to the specified file after the specified file has been moved from the solid-state drive primary storage to the magnetic disk drive secondary storage.

5. A file server system comprising:

solid-state drive primary storage;

magnetic disk drive secondary storage; and at least one processor coupled to the solid-state drive primary storage and coupled to the magnetic disk drive secondary storage for providing a client with access to files in the solid-state drive primary storage and for providing the client with access to files in the magnetic disk drive secondary storage;

wherein said at least one processor is programmed with a file migration engine program executable by said at least one processor to move a specified file from the solid-state drive primary storage to the magnetic disk drive secondary storage; and said at least one processor is further programmed with a stub file manager program executable by said at least one processor to create a corresponding stub file in the solid-state drive primary storage for the specified file, the corresponding stub file containing file mapping metadata of the specified file in the magnetic disk drive secondary storage, the file mapping metadata of the specified file in the corresponding stub file mapping an extent of data in the specified file to a logical block address of magnetic disk drive secondary storage containing data of the specified file in the magnetic disk drive secondary storage, and the stub file manager program is further executable by said at least one processor to respond to a request from the client for reading data of the specified file by reading the file mapping metadata from the corresponding stub file to obtain the logical block address of the magnetic disk drive secondary storage containing the data of the specified file, and said at least one processor is further programmed to read the data of the specified file from the logical block address of the magnetic disk drive secondary storage containing the data of the specified file, and to return to the client the data of the specified file read from the logical block address of the magnetic disk drive secondary storage containing the data of the specified file, wherein said at least one processor is programmed to create a multiplicity of files in the solid-state drive primary storage, to record that some of the files in the solid-state drive primary storage have been read by an application, and upon each of the files from the solid-state drive primary storage to the magnetic disk drive secondary storage, to check whether there is a record that said each of the files has been read by an application, and in response to finding that there is a record for each of the files that has been read by an application, to create a corresponding stub file in the solid-state drive primary storage for said each of the files that has been read by an application.

6. A file server system comprising:

solid-state drive primary storage;

magnetic disk drive secondary storage; and at least one processor coupled to the solid-state drive primary storage and coupled to the magnetic disk drive secondary storage for providing a client with access to files in the solid-state drive primary storage and for providing the client with access to files in the magnetic disk drive secondary storage;

wherein said at least one processor is programmed with a file migration engine program executable by said at least one processor to move a specified file from the solid-state drive primary storage to the magnetic disk drive secondary storage; and said at least one processor is further programmed with a stub file manager program executable by said at least one processor to create a corresponding stub file in the solid-state drive primary storage for the specified file, the corresponding stub file containing file mapping metadata of the specified file in the magnetic disk drive secondary storage, the file mapping metadata of the specified file in the corresponding stub file mapping an extent of data in the specified file to a logical block address of magnetic disk drive secondary storage containing data of the specified file in the magnetic disk drive secondary storage, and the stub file manager program is further executable by said at least one processor to respond to a request from the client for reading data of the specified file by reading the file mapping metadata from the corresponding stub file to obtain the logical block address of the magnetic disk drive secondary storage containing the data of the specified file, and said at least one processor is further programmed to read the data of the specified file from the logical block address of the magnetic disk drive secondary storage containing the data of the specified file, and to return to the client the data of the specified file read from the logical block address of the magnetic disk drive secondary storage containing the data of the specified file;

wherein the magnetic disk drive secondary storage contains a plurality of file systems, and wherein the file migration engine is executable by said at least one processor to move the specified file from the solid-state drive primary storage to the magnetic disk drive secondary storage by executing a respective file mover program thread for a selected one of the file systems to move the specified file from the solid-state drive primary storage to the selected one of the file systems in the magnetic disk drive secondary storage; and wherein the file systems have been configured for different application access patterns, and wherein the file server system further includes a policy engine program executable by said at least one processor to select the selected one of the file systems in the magnetic disk drive secondary storage in order to match an expected access pattern upon the specified file to a configuration of the selected one of the file systems, and to balance loading upon the file systems in the magnetic disk drive secondary storage, wherein said at least one processor is programmed to create a list of files that have been closed in the solid-state drive primary storage, and to move each file on the list from the solid-state drive primary storage to the magnetic disk drive secondary storage; and wherein said at least one processor is further programmed to flag certain files on the list for which corresponding stub files should be created in the solid-state drive primary storage upon moving the certain files from the solid-state drive primary storage to the magnetic disk drive secondary storage, and to create corresponding stub files in the solid-state drive primary storage for the certain files upon moving the certain files from the solid-state drive primary storage to the magnetic disk drive secondary storage, the corresponding stub files in the solid-state drive primary storage including file mapping metadata mapping data in extents of the certain files to logical block addresses of the magnetic disk drive secondary storage containing data of the certain files.

* * * * *